(12) United States Patent
Bursell (10) Patent No.: US 11,263,318 B2
(45) Date of Patent: Mar. 1, 2022

(54) MONITORING A PROCESS IN A TRUSTED EXECUTION ENVIRONMENT TO IDENTIFY A RESOURCE STARVATION ATTACK

(71) Applicant: Red Hat, Inc., Raleigh, NC (US)

(72) Inventor: Michael H. M. Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 425 days.

(21) Appl. No.: 16/180,091

(22) Filed: Nov. 5, 2018

(65) Prior Publication Data

US 2020/0143044 A1 May 7, 2020

(51) Int. Cl.
*G06F 21/00* (2013.01)
*G06F 21/55* (2013.01)
*G06F 21/75* (2013.01)
*G06F 21/57* (2013.01)

(52) U.S. Cl.
CPC .......... *G06F 21/552* (2013.01); *G06F 21/577* (2013.01); *G06F 21/75* (2013.01)

(58) Field of Classification Search
CPC ........ G06F 21/577; G06F 21/75; G06F 21/57; G06F 12/0284; G06F 3/0653; G06F 21/552
USPC .......................................................... 726/22
See application file for complete search history.

(56) References Cited

U.S. PATENT DOCUMENTS

| | | | |
|---|---|---|---|
| 6,108,739 A | 8/2000 | James et al. | |
| 7,590,855 B2 | 9/2009 | Irwin | |
| 7,607,131 B2 * | 10/2009 | Oe | G06F 9/468 709/229 |
| 8,935,746 B2 | 1/2015 | Vetillard | |
| 9,197,656 B2 * | 11/2015 | Butler | H04L 63/1408 |
| 10,027,717 B2 | 7/2018 | Ben-Shalom et al. | |
| 2008/0115205 A1 * | 5/2008 | Aaron | H04L 63/20 726/14 |
| 2010/0235542 A1 * | 9/2010 | Visharam | H04N 21/23805 709/246 |
| 2014/0283099 A1 | 9/2014 | Smith et al. | |
| 2015/0358301 A1 * | 12/2015 | Dalbehera | G06F 21/57 713/171 |
| 2016/0094573 A1 * | 3/2016 | Sood | H04L 63/061 713/156 |
| 2016/0283411 A1 | 9/2016 | Shelter et al. | |
| 2016/0350534 A1 | 12/2016 | Poornachandran et al. | |

(Continued)

OTHER PUBLICATIONS

Author Unknown, "Introduction to Trusted Execution Environments," globalplatform.org/wp-content/uploads/2018/05/Introduction-to-Trusted-Execution-Environment-15May2018.pdf, May 2018, GlobalPlatform, Inc., 9 pages.

(Continued)

*Primary Examiner* — Josnel Jeudy
(74) *Attorney, Agent, or Firm* — Withrow & Terranova, PLLC (57) ABSTRACT

Monitoring a process in a trusted execution environment (TEE) to identify a resource starvation attack. A first monitor executing outside of a first TEE determines that a first process is executing in the first TEE. The first monitor makes a determination that the first process is being denied resources necessary for execution of the first process. The first monitor sends an indication indicating that the first process is being denied resources necessary for execution of the first process.

18 Claims, 8 Drawing Sheets

(56) References Cited

U.S. PATENT DOCUMENTS

2017/0250892 A1     8/2017   Cooper et al.
2020/0034528 A1*   1/2020   Yang .................... H04L 9/0861

OTHER PUBLICATIONS

Atamli-Reineh, Ahmad, et al., "A Framework for Application Partitioning using Trusted Execution Environments," Cuncurrency and Computation: Practice and Experience, 2010, John Wiley & Sons, Ltd., 23 pages.

Jang, Jinsoo, et al., "Private Zone: Providing A Private Execution Environment using ARM TrustZone," IEEE Transactions on Dependable and Secure Computing, 2016, IEEE, 14 pages.

Jang, Jinsoo, et al., "SeCReT: Secure Channel between Rich Execution Environment and Trusted Execution Environment," Network and Distributed System Security Symposium, Feb. 2015, San Diego, California, Internet Society, 15 pages.

Masti, Ramya, "Enabling Isolation on Modern Computing Platforms," Doctoral Thesis, 2015, ETH Library, 197 pages.

Ning, Zhenyu, et al., "Position Paper: Challenges Towards Securing Hardware-assisted Execution Environments," Proceedings of the Hardware and Architectural Support for Security and Privacy, Jun. 25, 2017, Toronto, Canada, ACM, 8 pages.

Norton, Seih, et al., "Designing a Secure, High-Performance Remote Attestation Protocol," Trusted Execution Development, Oct. 13, 2016, Mitre Corporation, 64 pages.

Sabt, M. et al., "Trusted Execution Environment: What It is, and What It is Not," 2015 IEEE Trustcom/BigDataSE/ISPA, Aug. 20-22, 2015, Helsinki, Finland, IEEE, pp. 57-64.

Notice of Allowance for U.S. Appl. No. 16/246,946, dated Nov. 29, 2021, 10 pages.

\* cited by examiner

MONITORING A PROCESS IN A TRUSTED EXECUTION ENVIRONMENT TO IDENTIFY A RESOURCE STARVATION ATTACK

TECHNICAL FIELD

The examples relate generally to trusted execution environments (TEEs), and in particular to monitoring a process in a TEE to identify a resource starvation attack.

BACKGROUND

Processor manufacturers are increasingly interested in providing a trusted execution environment (TEE) that allows code and data within the TEE to be protected with respect to confidentiality. Examples of TEEs include Intel's SGX TEE and AMD's SeV TEE. Processes executing in a TEE cannot be queried or monitored by a host operating system.

SUMMARY

The examples relate to monitoring a process in a trusted execution environment (TEE) to identify a resource starvation attack. If a resource starvation attack is detected, a monitor sends an indication that indicates that the process in the TEE is being denied resources necessary for execution of the process. The entity that receives the indication can, for example, terminate the TEE and restart the process in another TEE, such as in a TEE on a different computing device.

In one example, a method is disclosed. The method includes determining, by a first monitor executing outside of a first TEE that a first process is executing in the first TEE. The method further includes making, by the first monitor, a determination that the first process is being denied resources necessary for execution of the first process. The method further includes sending, by the first monitor, an indication indicating that the first process is being denied resources necessary for execution of the first process.

In another example, a system is provided. The system includes a first computing device comprising a first memory and a first processor device coupled to the first memory. The first processor device is to initiate a monitor in the first computing device, the monitor to make a determination that a first process executing in a first TEE is being denied resources necessary for execution of the first process. The first processor device is further to, in response to making the determination that the first process is being denied the resources, send an indication indicating that the first process is being denied resources necessary for execution of the first process.

In another example, a computer program product is provided. The computer program product is stored on a non-transitory computer-readable storage medium and includes instructions to cause a processor device to determine, by a first monitor executing outside of a first TEE that a first process is executing in the first TEE. The instructions further cause the processor device to make, by the first monitor, a determination that the first process is being denied resources necessary for execution of the first process. The instructions further cause the processor device to send, by the first monitor, an indication indicating that the first process is being denied resources necessary for execution of the first process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first process" and "second process," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Processor manufacturers are increasingly interested in providing trusted execution environments (TEEs) that allow code and data within the TEE to be protected with respect to confidentiality. Examples of TEEs include Intel's SGX TEE and AMD's SeV TEE. Processes executing in a TEE cannot, by design, be queried or monitored by a host operating system, and thus the host operating system is unable to determine whether a process in a TEE is executing properly or not.

However, a process executing in a TEE utilizes certain resources, such as memory and a processor, that are managed and controlled by the host operating system. Accordingly, a malicious process can perform a resource starvation attack on the process in the TEE by, for example, utilizing all available processor cycles of a processor device, or by consuming all available memory of the computing device. If the process executing in the TEE is denied resources, the process is unable to communicate with a management console or other external process to notify the external process of the attack.

The examples disclosed herein implement monitoring of a process in a TEE to identify a resource starvation attack on the TEE. If a resource starvation attack is detected, a monitor sends an indication that indicates that the process in the TEE is being denied resources necessary for execution of the process. The entity that receives the indication can, for example, terminate the TEE and restart the process in another TEE, such as in a TEE on a different computing device.

Figure 1A:
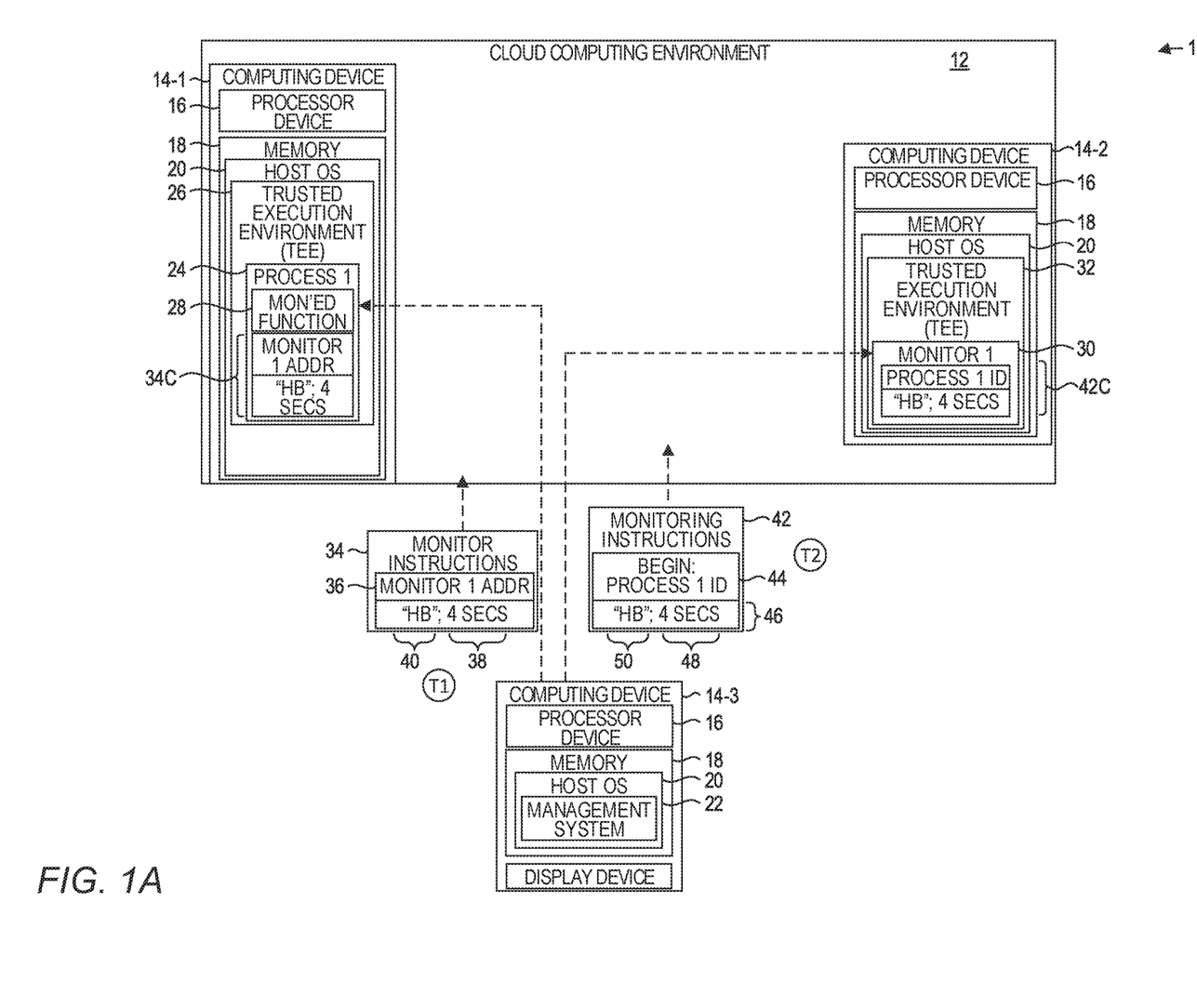
FIGS. 1A-1C are block diagrams at successive points in time that illustrate an environment in which examples may be practiced.
Figure 1B:
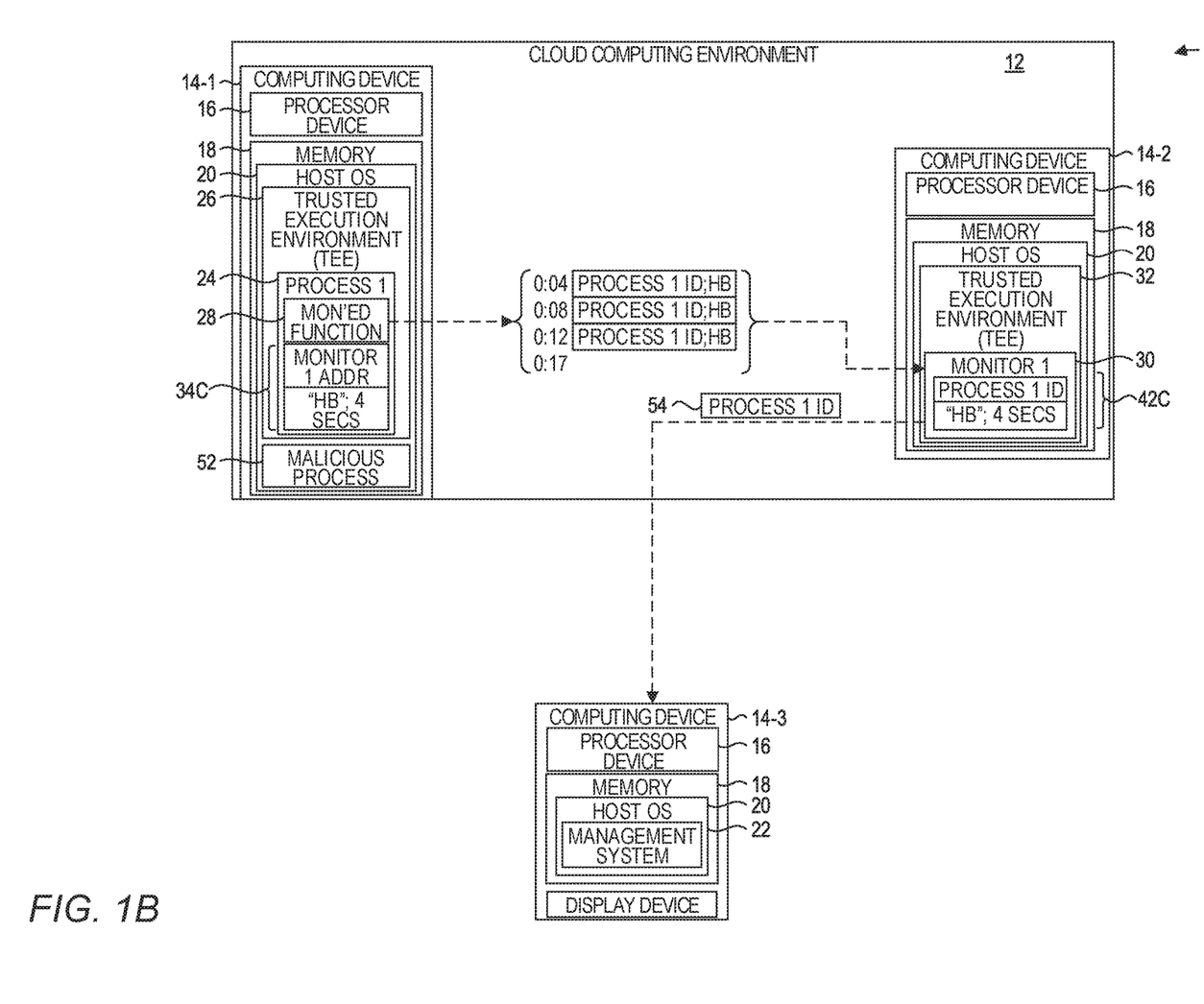
Figure 1C:
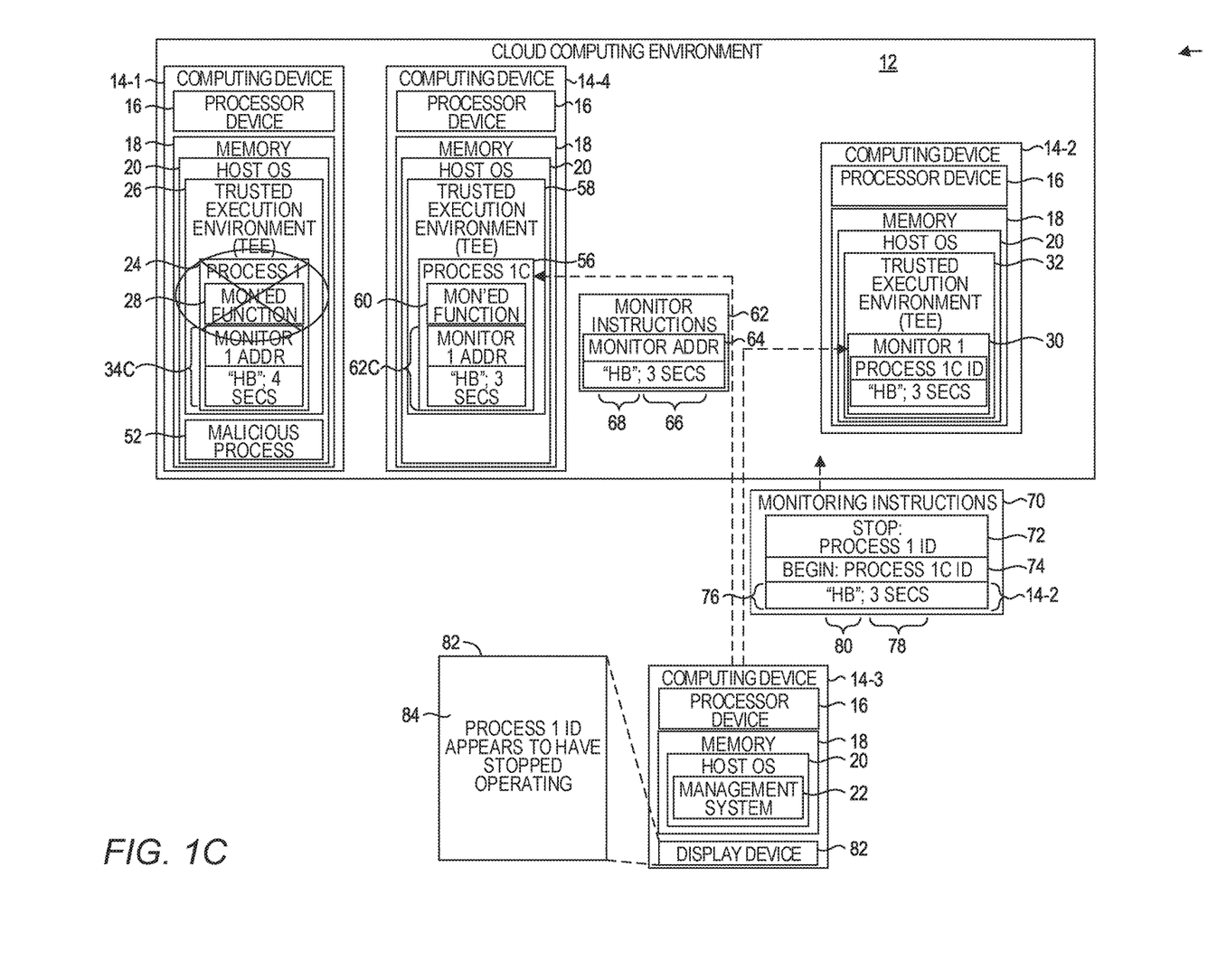

FIGS. 1A-1C are block diagrams at successive points in time that illustrate an environment 10 in which examples may be practiced. Referring first to FIG. 1A, the environment 10 includes a cloud computing environment 12. The phrase "cloud computing environment" refers to a computing environment, often provided by a third party, that facilitates dynamic and scalable computing resources as needed. Examples of cloud computing environments include Amazon AWS and Microsoft Azure. It should be noted that while for purposes of illustration the examples are disclosed in the context of a cloud computing environment, the examples disclosed herein are not limited to a cloud computing environment and have applicability to any environment in which a TEE is used. The phrase "trusted execution environment (TEE)" as used herein refers to a processor device-implemented environment that allows code and data within the environment (i.e, the TEE) to be protected with respect to confidentiality.

The environment 10 includes three computing devices 14-1, 14-2, and 14-3 (generally, computing devices 14). The computing devices 14-1 and 14-2 are in the cloud computing environment 12. The computing device 14-3 is outside of the cloud computing environment 12 and controls, in conjunction with the cloud computing environment 12, the initiation and termination of various processes on the computing devices 14-1 and 14-2. The computing devices 14 may comprise any suitable type of computing device, and each includes a processor device 16 and a memory 18. The processor devices 16 of the computing devices 14-1 and 14-2 are capable of implementing a TEE. The computing devices 14 may be running any suitable host operating system (OS) 20, such as a Microsoft windows host OS 20, Linux host OS 20 or the like.

The computing device 14-3 includes a management system 22 that is responsible for causing the initiation of various processes in the cloud computing environment 12. The management system 22 may cause the initiation of processes in the cloud computing environment 12 in response to demand, or any other suitable criteria. In this example, the management system 22 causes the initiation of a process 24 in a trusted execution environment 26 of the computing device 14-1. The process 24 includes functionality depicted as a monitored (MON'ED) function 28. Functionality implemented by the monitored function 28 will be described herein below. The process 24 may implement any desired functionality, such as a desired business functionality or the like. It will be noted that because the management system 22 is a component of the computing device 14-3, functionality implemented by the management system 22 may be attributed to the computing device 14-3 generally. Moreover, in examples where the management system 22 comprises software instructions that program a processor device 16 to carry out functionality discussed herein, functionality implemented by the management system 22 may be attributed herein to the processor device 16.

The management system 22 also causes the initiation of a monitor 30 in a trusted execution environment 32 of the computing device 14-2. It should be noted that while the process 24 and the monitor 30 are illustrated as being located on separate computing devices 14, in other examples, the process 24 and the monitor 30 may be implemented on a same computing device 14. It will be noted that because the monitor 30 is a component of the computing device 14-2, functionality implemented by the monitor 30 may be attributed to the computing device 14-2 generally. Moreover, in examples where the monitor 30 comprises software instructions that program a processor device 16 to carry out functionality discussed herein, functionality implemented by the monitor 30 may be attributed herein to the processor device 16. It should be noted that while the process 24 and the monitor 30 are illustrated as being located on separate computing devices 14, in other examples, the process 24 and the monitor 30 may be implemented on a same computing device 14.

At a time T1, the management system 22 provides the process 24 monitor instructions 34 that include an address 36 of the monitor 30 and a periodic interval 38 at which the process 24 is to send a message 40 to the monitor 30. The management system 22 may communicate the monitor instructions 34 to the process 24 in any suitable manner. In some examples, the management system 22 communicates the monitor instructions 34 to the process 24 via environment variables. The process 24 saves the monitor instructions 34 as monitoring instructions 34C for subsequent use, as discussed in greater detail below.

At a time T2, the management system 22 sends monitoring instructions 42 to the monitor 30. The monitoring instructions 42 include a process identifier 44 and monitoring criteria 46 that identify criteria for determining whether the process 24 is being denied resources necessary for execution. In this example, the monitoring criteria 46 include a periodic interval 48 at which the process 24 is to send a message 50 to the monitor 30. The monitor 30 stores the monitoring instructions 42 as monitoring instructions 42C for subsequent use.

FIG. 1B illustrates the environment 10 at a point in time after the process 24 has initiated. After the process 24 initiates, the monitored function 28 in the process 24, based on the monitor instructions 34C, sends a message ("HB") every four seconds to the monitor 30. The monitor 30, in turn, based on the monitoring instructions 42C, expects a message "HB" from the process 24 periodically every four seconds. As illustrated in FIG. 1B, the monitored function 28 sends the appropriate message at 0:04, 0:08, and 0:12 seconds after initiation of the process 24. Assume for purposes of illustration that at 0:14 after initiation of the process 24, a malicious process 52 initiates. The malicious process 52 has been developed to "starve" the TEE 26, and thus the process 24, of resources. Such resources may include, for example, access to the processor device 16, the memory 18, a network, a graphics processor unit (GPU), a storage device, a display device, a keyboard, or the like. Because by design the host OS 20 cannot monitor or query the process 24 in the TEE 26, the host OS 20 is unable to determine that the process 24 is being starved of resources. While for purposes of illustration the process 24 is illustrated separately from the host OS 20, in other examples, the host OS 20 itself may be compromised and behaving maliciously to starve the TEE 26 of resources.

Because the TEE 26 and process 24 are unable to obtain the resources of the processor device 16 and/or the memory 18, at time 0:16 after initiation of the process 24, the monitored function 28 is unable to send the expected message to the monitor 30. At time 0:17 after initiation of the process 24 the monitor 30 determines that the process 24 has not sent the specified message to the monitor 30 and generates an indication 54 that identifies the process 24 as a process that is being denied resources necessary for execution. In this example, the monitor 30 sends the indication 54 to the management system 22.

FIG. 1C illustrates the environment 10 at a point in time after the management system 22 receives the indication 54. After the management system 22 receives the indication 54, the management system 22 terminates the process 24. The management system 22 initiates a process 56 that is a copy of the process 24 in a TEE 58 of a computing device 14-4. The process 56 includes a monitored function 60 which operates substantially the same as the monitored function 28. The management system 22 sends the process 56 monitor instructions 62 that include an address 64 of the monitor 30 and a periodic interval 66 at which the process 56 is to send a message 68 to the monitor 30. The process 56 saves the monitor instructions 62 as monitor instructions 62C.

The management system 22 sends to the monitor 30 monitoring instructions 70 that include a message 72 that instructs the monitor 30 to no longer monitor the process 24 and to begin monitoring the process 56. The monitoring instructions 70 also include a process identifier 74, which identifies the process 56, and monitoring criteria 76, which identify criteria for determining whether the process 56 is being denied resources necessary for execution. In this example, the monitoring criteria 76 include a periodic interval 78 at which the process 56 is to send a message 80 to the monitor 30. In this example, the management system 22 also presents on a display device 82 a message 84 to an operator that indicates that the process 24 appears to have stopped operating. Subsequently, the monitored function 60 sends the monitor 30 the message 68 ("HB") at the periodic interval 66 (i.e., every three seconds).

Figure 2:
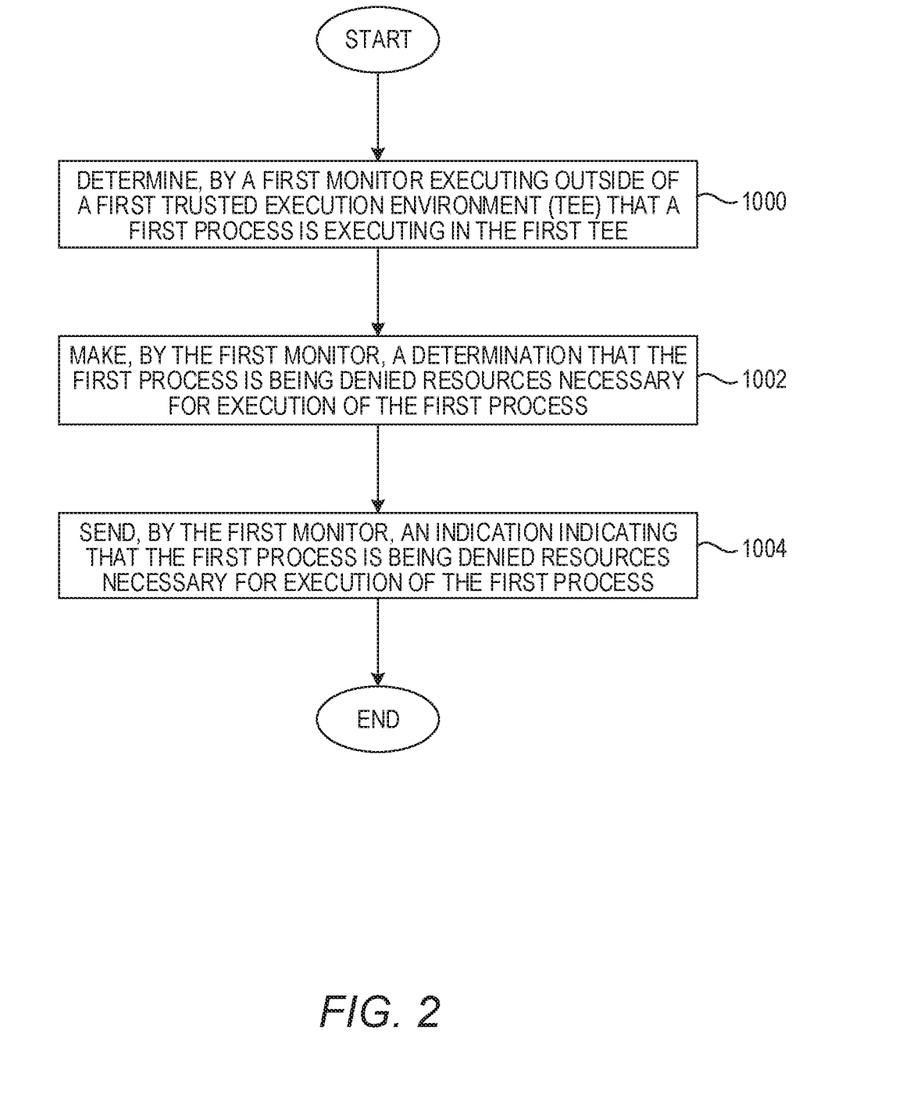
FIG. 2 is a flowchart of a method for monitoring a process in a trusted execution environment (TEE) to identify a resource starvation attack according to one example.

FIG. 2 is a flowchart of a method for monitoring a process in a TEE to identify a resource starvation attack according to one example. FIG. 2 will be discussed in conjunction with FIGS. 1A-1C. The monitor 30, executing outside of the TEE 26, determines that the process 24 is executing in the TEE 26 (FIG. 2, block 1000). This determination may be made in any number of ways, including, as discussed with regards to FIGS. 1A-1C, via communications with a centralized management mechanism, such as the management system 22. However, in other examples, the monitor 30 may determine that the process 24 is executing in the TEE via other mechanisms. For example, in some examples, the process 24 may be preconfigured with an address of the monitor 30, or otherwise obtain the address of the monitor 30 after initiation, and, shortly after initiation, may send the monitor 30 a message that identifies the process 24, as well as monitoring criteria that the monitor 30 may subsequently use to determine that the process 24 is being denied resources necessary for execution. In such implementations, the use of the management system 22 may not be necessary.

The monitor 30 makes a determination that the process 24 is being denied resources necessary for execution of the process 24 (FIG. 2, block 1002). The monitor 30 sends the indication 54 to the management system 22 that the process 24 is being denied resources necessary for execution of the process 24 (FIG. 2, block 1004).

Figure 3:
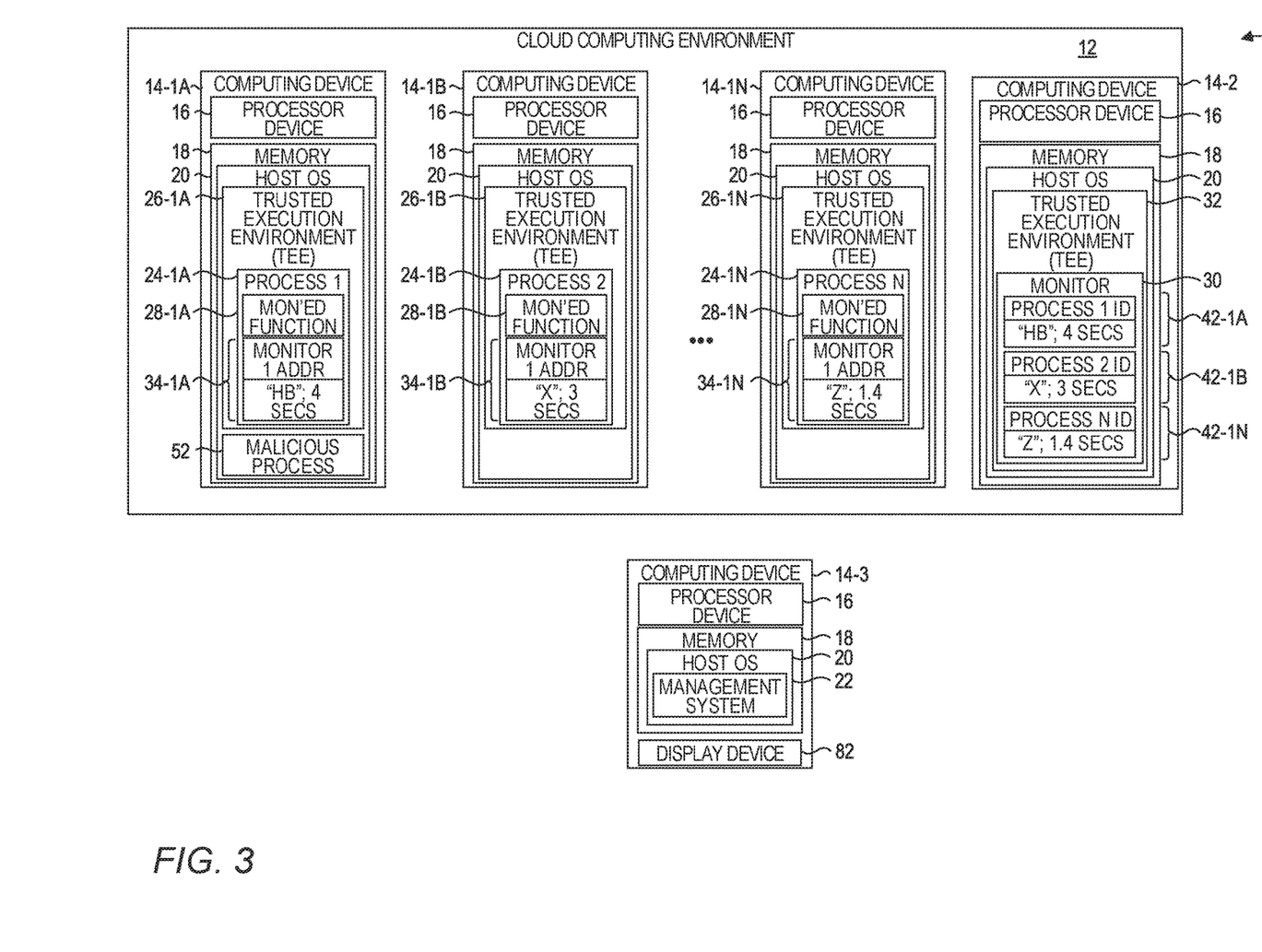
FIG. 3 is a block diagram that illustrates monitoring a plurality of processes in corresponding TEEs to identify resource starvation attacks according to another example.

FIG. 3 is a block diagram that illustrates the monitoring of a plurality of processes in corresponding TEEs to identify resource starvation attacks according to another example. In this example the management system 22 has initiated a plurality of processes 24-1A, 24-1B, and 24-1N in corresponding TEE's 26-1A, 26-1B, and 26-1N on corresponding computing devices 14-1A, 14-1B, and 14-1N. Each of the processes 24-1A, 24-1B, and 24-1N have corresponding monitored functions 28-1A, 28-1B, and 28-1N which, in accordance with monitor instructions 34-1A, 34-1B, and 34-1N, send messages at periodic intervals to the monitor 30. The monitor 30 receives monitoring instructions 42-1A, 42-1B, and 42-1N (generally, monitoring instructions 42) from the management system 22 that matches the monitor instructions 34-1A, 34-1B, and 34-1N.

The monitor 30 continuously, over a period of time, determines, based on the corresponding monitoring instructions 42 for each respective process 24 whether the respective process 24 is being denied resources necessary for execution. For each respective process 24 that, based on the corresponding monitoring instructions 42, it is determined that the respective process 24 is being denied resources necessary for execution, the monitor 30 sends an indication to the management system 22. As an example, if the monitor 30 does not receive a message "HB" every four seconds from the process 24-1A, the monitor 30 determines that the process 24-1A is being denied resources necessary for execution. It should be noted that the monitor 30 may implement a "grace period" in which to receive a message from a process 24 to compensate for normal transient throughput and/or processing bottlenecks in the cloud computing environment 12. For example, the monitor 30 may implement a one or two second grace period such that if the monitor 30 receives the appropriate message from the process 24-1A within six seconds rather than four seconds, the monitor 30 will determine that the process 24-1A is not being denied resources necessary for execution. Similarly, the monitor 30 expects to receive a message "X" every three seconds from the process 24-1B, and the message "Z" every 1.4 seconds from the process 24-1N. Failure to receive such messages within the designated periodic intervals and within any grace periods, if any, will result in the monitor 30 generating an indication that the respective process 24-1B or 24-1N, as the case may be, is being denied resources for execution.

Figure 4:
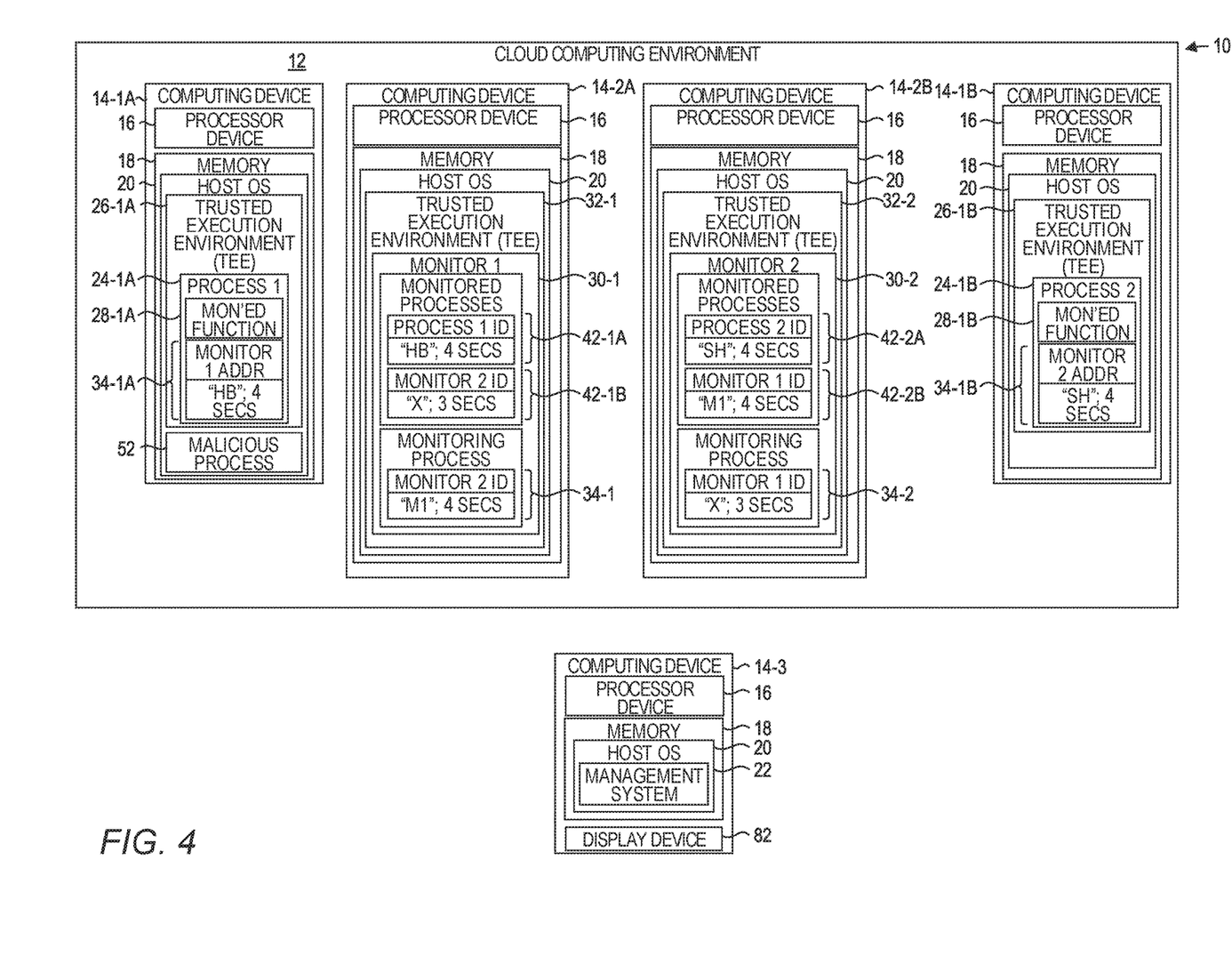
FIG. 4 is a block diagram that illustrates additional mechanisms for monitoring processes in TEEs to identify resource starvation attacks according to another example.

FIG. 4 is a block diagram that illustrates additional mechanisms for monitoring processes in TEEs to identify resource starvation attacks according to another example. In this example, the process 24-1A is monitored by a monitor 30-1. The process 24-1B is monitored by a monitor 30-2. The monitor 30-1 is monitored by the monitor 30-2, and the monitor 30-2 is monitored by the monitor 30-1. In particular, the monitor 30-1 includes the monitoring instructions 42-1A for monitoring the process 24-1A. The monitor 30-1 also includes the monitoring instructions 42-1B for monitoring the monitor 30-2. The monitoring instructions 42-1B include monitoring criteria that the monitor 30-1 can use to determine whether the monitor 30-2 is being denied resources necessary for execution. In this example, if the monitor 30-1 does not receive the message "X" periodically every three seconds, the monitor 30-1 may determine that the monitor 30-2 is being denied resources necessary for execution of the monitor 30-2. The monitor 30-1 also includes monitor instructions 34-1 that direct the monitor 30-1 to send a message "M1" periodically every four seconds to the monitor 30-2.

The monitor 30-2 includes monitoring instructions 42-2A and 42-2B. The monitoring instructions 42-2A are for monitoring the process 24-1B, and the monitoring instructions 42-2B are for monitoring the monitor 30-1. The monitor 30-2 also includes monitor instructions 34-2 that direct the monitor 30-2 to send the monitor 30-1 the message "X" periodically every three seconds. If the monitor 30-2 does not receive the message "M1" every four seconds from the monitor 30-1, the monitor 30-2 will generate an indication that indicates the monitor 30-1 is being denied resources necessary for execution.

Figure 5:
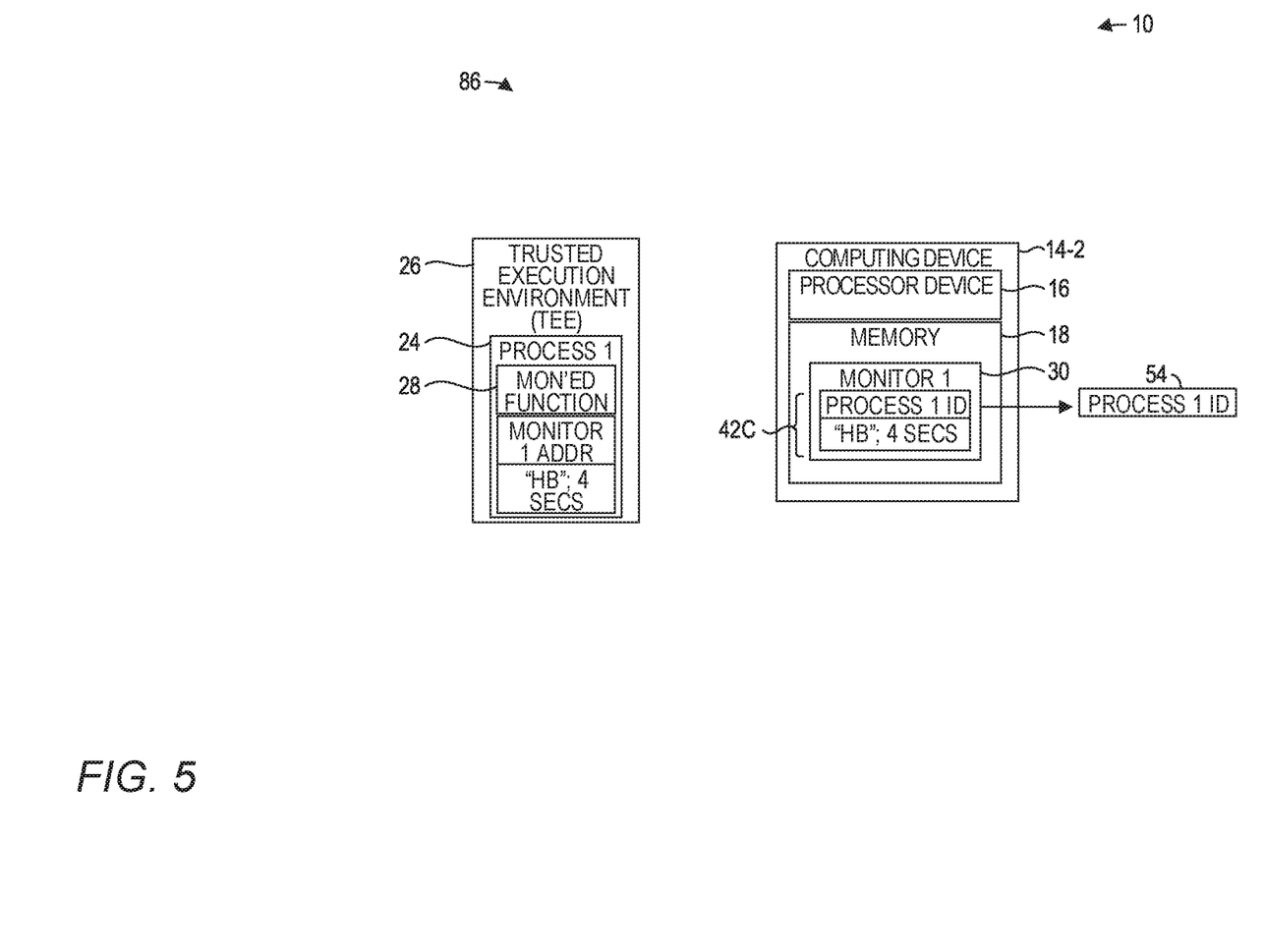
FIG. 5 is a simplified block diagram of the environment illustrated in FIG. 1, according to another example.

FIG. 5 is a simplified block diagram of the environment 10, according to another example. The environment 10 includes a system 86 that includes the computing device 14-2, the memory 18 and the processor device 16. The processor device 16 is coupled to the memory 18 and is to initiate the monitor 30 in the computing device 14-2. The monitor 30 is to make a determination that the process 24 executing in the TEE 26 is being denied resources necessary for execution of the process 24. In response to making the determination, the monitor 30 sends the indication 54 indicating that the process 24 is being denied resources necessary for execution of the process 24.

Figure 6:
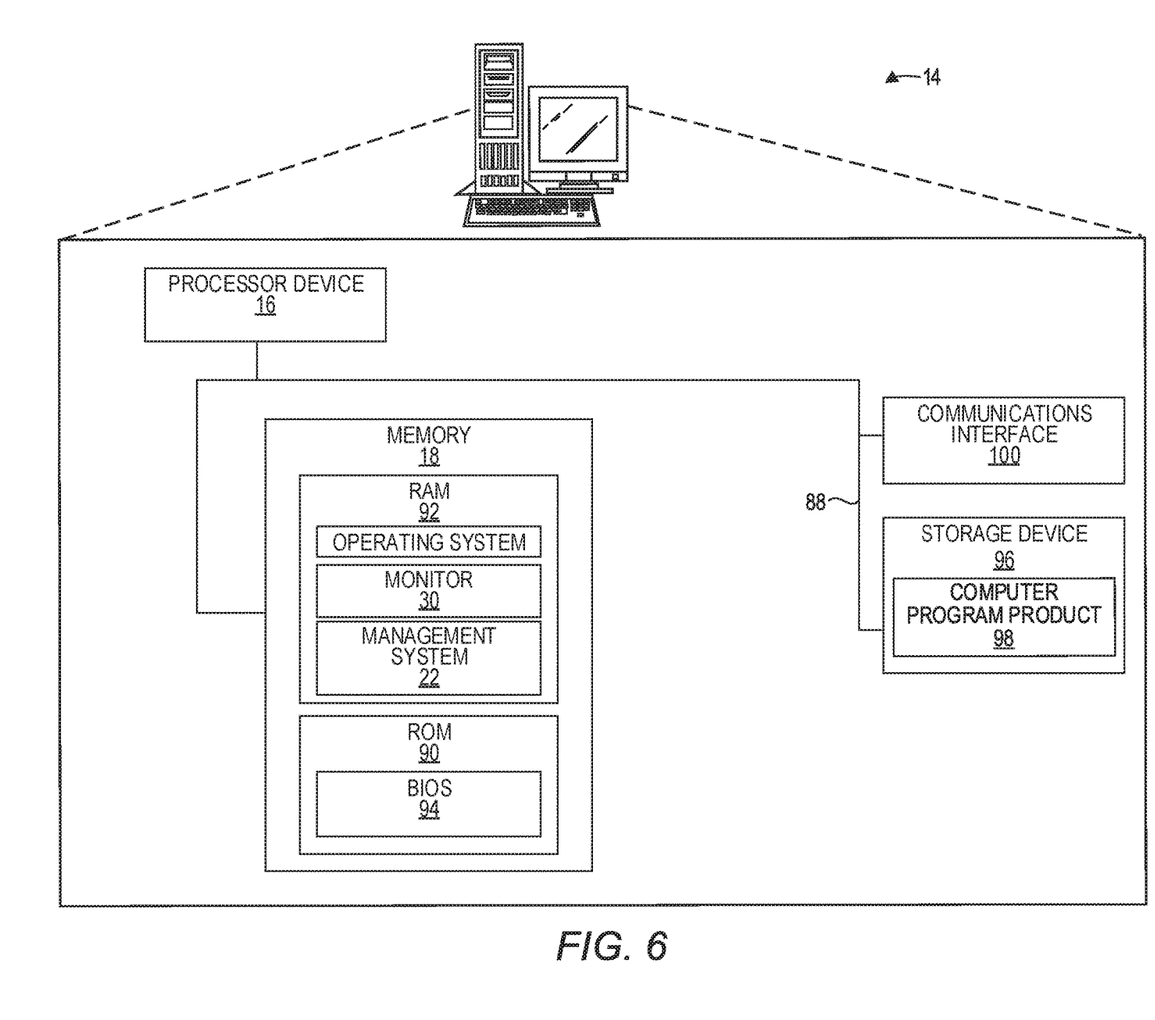
FIG. 6 is a block diagram of a computing device suitable for implementing any of the computing devices disclosed herein.

FIG. 6 is a block diagram of a computing device 14 suitable for implementing any of the computing devices disclosed herein. The computing device 14 may comprise any computing or electronic device capable of including firmware, hardware, and/or executing software instructions to implement the functionality described herein, such as a computer server, a desktop computing device, a laptop computing device, or the like. The computing device 14 includes the processor device 16, the memory 18, and a system bus 88. The system bus 88 provides an interface for system components including, but not limited to, the memory 18 and the processor device 16. The processor device 16 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The memory 18 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing device 14. The volatile memory 92 may also include a high-speed RAM, such as static RAM, for caching data.

The computing device 14 may further include or be coupled to a non-transitory computer-readable storage medium such as a storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 96 and in the volatile memory 92, including an operating system and one or more program modules, such as the monitor 30 and/or management system 22, which may implement the functionality described herein in whole or in part.

All or a portion of the examples may be implemented as a computer program product 98 stored on a transitory or non-transitory computer-usable or computer-readable storage medium, such as the storage device 96, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the monitor 30 and/or the management system 22 in the volatile memory 92, may serve as a controller, or control system, for the computing device 14 that is to implement the functionality described herein.

The computing device 14 may also include a communications interface 100, such as an Ethernet transceiver or the like, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a first monitor executing outside of a first trusted execution environment (TEE), information that identifies a plurality of processes, including a first process, each process executing in a corresponding TEE;
receiving, by the first monitor, corresponding monitoring criteria for each respective process that identify criteria for determining whether the respective process is being denied resources necessary for execution of the respective process;
determining, by the first monitor executing outside of the first TEE that the first process is executing in the first TEE;
making, by the first monitor, a determination that the first process is being denied resources necessary for execution of the first process;
sending, by the first monitor, an indication indicating that the first process is being denied resources necessary for execution of the first process;
continuously, over a period of time, determining, based on the corresponding monitoring criteria for each respective process, whether the respective process is being denied resources necessary for execution of the respective process; and
sending an indication for each respective process for which, based on the corresponding monitoring criteria, it is determined that the respective process is being denied resources necessary for execution of the respective process.

2. The method of claim 1 wherein the first monitor executes in a second TEE.

3. The method of claim 2 wherein the first process executes in the first TEE on a first computing device and the first monitor executes in the second TEE on a second computing device.

4. The method of claim 1 wherein the first monitor receives monitoring criteria that identify criteria for determining whether the first process is being denied resources necessary for execution of the first process.

5. The method of claim 4 wherein making the determination that the first process is being denied resources necessary for execution of the first process further comprises determining, by the first monitor, based on the monitoring criteria that the first process is being denied resources necessary for execution of the first process.

6. The method of claim 4 wherein the monitoring criteria identify a message and a periodic interval at which the message is to be received by the first monitor from the first process.

7. The method of claim 6 wherein making the determination that the first process is being denied resources necessary for execution of the first process further comprises determining, by the first monitor, that the message has not been received at the periodic interval from the first process.

8. The method of claim 1 further comprising:
initiating, by a management system, the first process in the first TEE on a first computing device; and
initiating, by the management system, the first monitor in a second TEE on a second computing device.

9. The method of claim 8 wherein initiating the first process in the first TEE further comprises initiating the first process in the first TEE with monitor instructions that identify an address of the first monitor, and a periodic interval at which the first process is to send a message to the first monitor.

10. The method of claim 9 wherein initiating the first monitor in the second TEE further comprises initiating the first monitor with monitoring instructions that identify the first process, and the periodic interval at which the first process is to send the message to the first monitor.

11. The method of claim 8 further comprising:
receiving, by the management system, the indication indicating that the first process is being denied resources necessary for execution of the first process;
in response to receiving the indication:
terminating the first process; and
initiating a second process that is a copy of the first process in a TEE on a different computing device than the first computing device.

12. The method of claim 11 further comprising:
sending the first monitor a message that instructs the first monitor to no longer monitor the first process and to begin monitoring the second process.

13. The method of claim 1 wherein the first monitor executes in a second TEE, and further comprising:
determining, by a second monitor executing in a third TEE that is monitoring a second process in a fourth TEE, that the first monitor is being denied resources necessary for execution of the first monitor; and
sending an indication indicating that the first monitor is being denied resources necessary for execution of the first monitor.

14. A system comprising:
a first computing device comprising:
a first memory;
a first processor device coupled to the first memory to:
receive information that identifies a plurality of processes, including a first process, each process executing in a corresponding trusted execution environment (TEE);
receive corresponding monitoring criteria for each respective process that identify criteria for determining whether the respective process is being denied resources necessary for execution of the respective process;
initiate a monitor in the first computing device, the monitor to make a determination that a first process executing in a first TEE is being denied resources necessary for execution of the first process;
in response to making the determination that the first process is being denied the resources, send an indication indicating that the first process is being denied resources necessary for execution of the first process; continuously, over a period of time, determine, based on the corresponding monitoring criteria for each respective process, whether the respective process is being denied resources necessary for execution; and
send an indication for each respective process for which, based on the corresponding monitoring criteria, it is determined that the respective process is being denied resources necessary for execution of the respective process.

15. The system of claim 14 further comprising:
a second computing device comprising:
a second memory;
a second processor device coupled to the second memory to:
initiate the first process in a second TEE of the second computing device, the first process to send a message to the monitor in the first computing device at a periodic interval.

16. The system of claim 15 wherein the first processor device is to initiate the first monitor with monitoring criteria that identify criteria for determining whether the first process is being denied resources necessary for execution of the first process.

17. The system of claim 16 wherein to make the determination that the first process is being denied resources necessary for execution of the first process, the monitor is to determine, based on the monitoring criteria, that the first process is being denied resources necessary for execution of the first process.

18. A computer program product stored on a non-transitory computer-readable storage medium and including instructions to cause a processor device to:
receive, by a first monitor executing outside of a first trusted execution environment (TEE), information that identifies a plurality of processes, including a first process, each process executing in a corresponding TEE;
receive, by the first monitor, corresponding monitoring criteria for each respective process that identify criteria for determining whether the respective process is being denied resources necessary for execution of the respective process;
determine, by the first monitor executing outside of the first TEE that the first process is executing in the first TEE;
making, by the first monitor, a determination that the first process is accessing resources necessary for execution of the first process; and make, by the first monitor, a determination that the first process is being denied resources necessary for execution of the first process;

send, by the first monitor, an indication indicating that the first process is being denied resources necessary for execution of the first process;

continuously, over a period of time, determine, based on the corresponding monitoring criteria for each respective process, whether the respective process is being denied resources necessary for execution of the respective process; and send an indication for each respective process for which, based on the corresponding monitoring criteria, it is determined that the respective process is being denied resources necessary for execution of the respective process.

* * * * *